May 10, 1927.
R. F. FREEMAN
TIRE CARRIER
Filed April 14, 1926
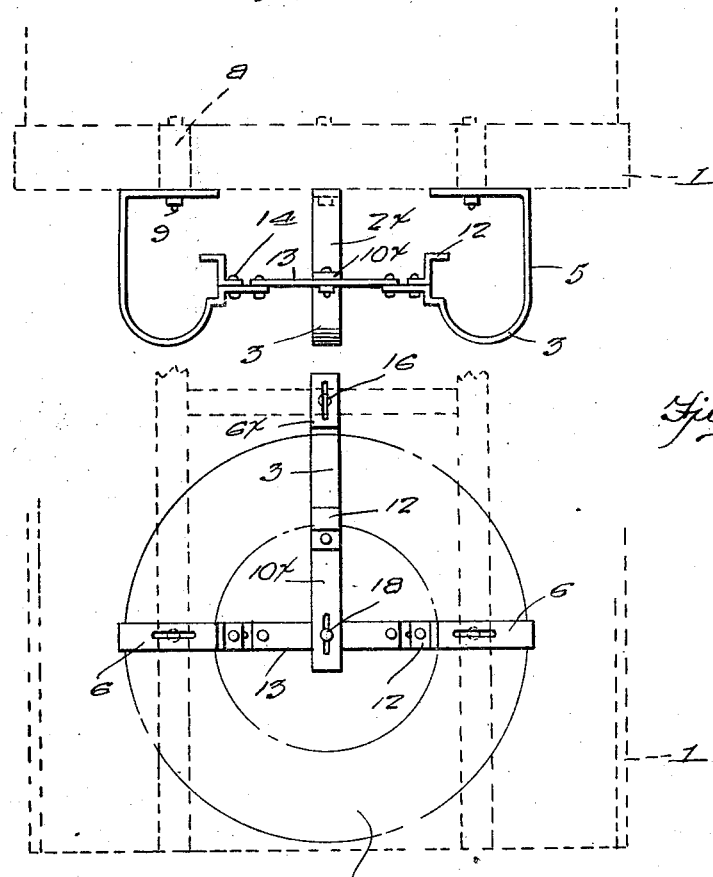
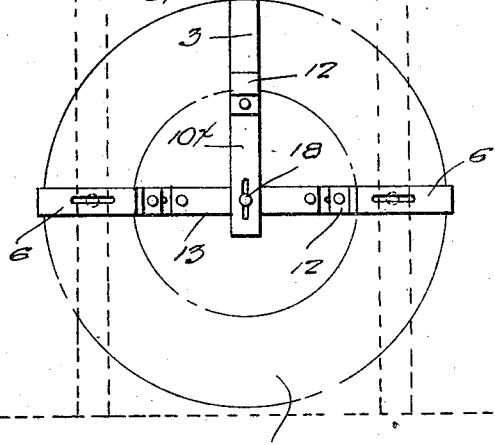
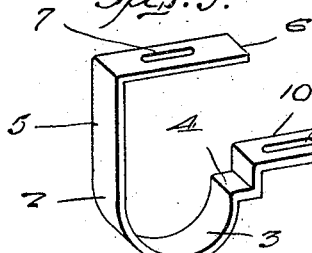
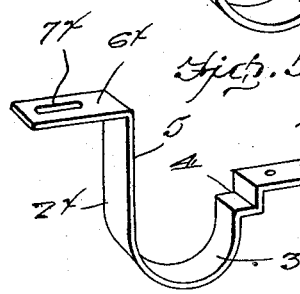
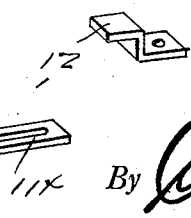
Inventor
R. F. Freeman
By Clarence A. O'Brien
Attorney

Patented May 10, 1927.

1,628,538

UNITED STATES PATENT OFFICE.

RALPH F. FREEMAN, OF ASHLAND, KANSAS, ASSIGNOR OF ONE-HALF TO ROBERT D. SMITH, OF ASHLAND, KANSAS.

TIRE CARRIER.

Application filed April 14, 1926. Serial No. 101,996.

My present invention pertains to tire carriers for motor vehicles, and it has for its general object the provision of a peculiar and advantageous device for carrying tires in an out of the way position on motor trucks, the said device being possessed of such capacity of adjustment that it may be fitted to differently arranged sills and for the carrying of tires of different sizes, and this in such manner that the tires will not be subjected to frictional wear and hence will not be deteriorated incident to the carriage thereof as spare tires.

Other objects and practical advantages of the invention will be fully understood from the following description and claims when the same are read in connection with the drawings, accompanying and forming part of this specification, in which:—

Figure 1 is a rear elevation illustrating the preferred embodiment of my invention as the same appears when properly arranged relative to the body of a motor truck.

Figure 2 is a top plan view of my improvement, the motor truck being shown in dotted line.

Figures 3 to 6 are perspectives of parts comprised in my novel carrier and hereinafter explicitly referred to.

Similar numerals of reference designate corresponding parts in all of the views of the drawings.

I show in Figures 1 and 2, a truck body 1, the said showing being in dotted lines.

I also show in Figures 1 and 2 the arrangement of my improvement relative to the truck body 1.

Among other elements my improved tire carrier comprises two spaced cradles 2 which are of hanger type and are preferably formed of appropriate metals. The said cradles 2 are reversely arranged, Figures 1 and 2, and each is formed in one piece, and each includes a concavo-convex portion 3 to conform to the transverse curvature of a tire or tire casing. Each of the said cradles 2 is also provided with a seat or rest 4 for the rim portion of a tire, and is further provided with a pendent portion 5 on an angularly disposed arm 6, the said arm 6 being longitudinally slotted at 7 and being designed to be connected to a sill 8 or any other appropriate part of a truck body through the medium of a bolt 9 equipped with a nut or through the medium of any other appropriate means compatible with the purpose of my invention and adapted to lend itself to outward and inward adjustment of the cradles 2 and the subsequent adjustable fixing of the same. The tire rest portion 4 of each cradle 2 is of right angle formation, and extending from the vertically disposed portion of said rest 4 is an arm 10 longitudinally slotted at 11 and designed for the connection of an angular retainer 12 and also designed for the adjustable connection of one end of a transverse tie bar 13, Figures 1, 2 and 4. The retainer 12 complementary to each cradle 2 is designed to rest above the rim portion of the tire and hold the tire on the seat 4, and in this connection it will be appreciated that the major portion of the tire will be spaced from the concavo-convex portion 3 and the pendent arm 5 of the cradle and hence will not be subjected to frictional wear during the carriage of the spare tire. By virtue of the slot 11 in the cradles 2 it will be manifest that the said cradles may be adjustable toward and from each other and adjustably fixed with respect to the tie bar 13; and it will further be appreciated that by virtue of the slot 7 the cradles 2 may be adjustably fixed at different distances apart so as to properly accommodate and carry tires of different sizes. The bolts 14 which connect the retainers 12 to the cradles 2 may be and preferably are extended through the slots 11 of said cradles 2.

In addition to the elements thus far explicitly alluded to, my novel carrier comprises a third cradle $2^x$, the said third cradle $2^x$ being designed to be used in a position at right angles to a line extending to the cradles 2, and being designed to be spaced from the rear end of the truck body as are also the cradles 2 so that the tire, designated by 15, will be carried entirely under and in parallel relation to the body 1 and with the rearmost portion of the spare tire entirely in front of the rear end of the body 1 so that no portion of the spare tire 15 will offer any projection at the rear end of the body 1.

The auxiliary cradle $2^x$ has a concavo-convex portion 3 and a rest 4 and a hanger arm 5 similar to the said parts of the cradles 2. It will be readily understood, however, from Figure 5 that the auxiliary cradle has an outwardly directed arm 6ˣ at its upper end, said arm 6ˣ being slotted longitudinally at 7ˣ for the adjustable connection thereof to a portion of the body 1 as designated by 16 in Figure 2. It will also be noticed in Figure 5 that the right angle seat 4 is merged into a long arm 10ˣ which is longitudinally slotted at 11ˣ for adjustable connection of the said arm 10ˣ to the tie bar 13 at the point 17 and through the medium of a bolt 18 or other appropriate means. It follows from the described construction and mode of connecting the auxiliary cradle 2ˣ, that the said cradle 2ˣ is adapted to be adjusted longitudinally of the truck body 1 and at right angles to a line extending to the cradles 2 and adjustably fixed so that the auxiliary cradle 2ˣ as well as the cradles 2 will lend itself to the ready adaptation of the device for the proper carriage of spare tires of different sizes. It is not necessary to retain the rim portion of a spare tire in the seat 4 of the auxiliary cradle 2ˣ and hence the said auxiliary cradle 2ˣ is, by preference, not equipped with a retainer 12 such as used upon and in conjunction with each of the cradles 2.

It will be apparent from the foregoing that the retainers 12 are detachably as well as adjustably mounted, and that, therefore, a spare tire may be readily placed in and as readily removed from my novel carrier.

Having described my invention, what I claim and desire to secure by Letters-Patent, is:—

1. In combination, a vehicle body or frame, cradles disposed under the body or frame and spaced apart, each of said cradles having a longitudinally slotted arm opposed and adjustably connected to the underside of the body or frame and also having a pendent arm and a concavo-convex portion at the lower end of the pendent arm and a right angle seat at the opposite end of said concavo-convex portion and a longitudinally slotted arm extending inwardly from said seat, angular retainers arranged above the seat of said cradles and connected to the inwardly extending arms thereof, a tie bar adjustably connected to the inwardly extending arms of the said cradles, and an auxiliary cradle disposed at an angle to the first-named cradles and the said tie bar and having an upper bar adjustably connected with the body or frame and a pendent arm on said bar and a concavo-convex portion at the lower end of said pendent arm, and an angular seat at the opposite end of the concavo-convex portion and an arm into which said seat is merged, said arm adjustably connected with the said tie bar.

2. In combination, a vehicle body or frame, cradles disposed under and connected with said body or frame and spaced apart and having lower inwardly extending portions and seats for the rim portion of a tire at the inner ends of said portions, retainers connected with said cradles and arranged above and in opposite relation to said seats, means connected with and extending between the said cradles, and an auxiliary cradle arranged under the body or frame of the vehicle and at angle to the first-named cradles and the connection therebetween, and having a seat to receive the rim portion of a tire and connected with the means between the first-named cradles.

3. In combination, a vehicle body or frame, and a spare tire carrier arranged entirely under said body or frame and made up of cradles disposed transversely of the body or frame and hung therefrom and having seats to receive the rim portion of a spare tire, and a longitudinally disposed auxiliary cradle disposed under and hung from the body or frame and connected with the first-named cradles and having a seat to receive the rim portion of a tire; the transversely disposed cradles being equipped with retainers arranged above and in spaced relation to the seats of the transversely disposed cradles.

In testimony whereof I affix my signature.

RALPH F. FREEMAN.